United States Patent

[11] 3,569,753

| [72] | Inventor | Jirair A. Babikyan |
| --- | --- | --- |
| | | Providence, R.I. |
| [21] | Appl. No. | 742,002 |
| [22] | Filed | July 2, 1968 |
| [45] | Patented | Mar. 9, 1971 |
| [73] | Assignee | Sanders Associates, Inc. |
| | | Nashua, N.H. |

[54] SELF-STARTING SINGLE PHASE MOTOR
13 Claims, 8 Drawing Figs.

[52] U.S. Cl.................................................. 310/68,
310/268
[51] Int. Cl.....................................................H02K 11/00
[50] Field of Search........................................... 310/162-
—164, 268, 41, 198, 184, 188, 68, 68.1, 68.2,
68.3, 68.4; 318/174, 175, 445, 466, 467

[56] References Cited
UNITED STATES PATENTS

| 3,060,337 | 10/1962 | Henry-Baudot.............. | 310/268 |
| --- | --- | --- | --- |
| 3,375,386 | 3/1968 | Hayner et al. ................ | 310/268 |
| 3,462,668 | 8/1969 | Thompson.................... | 310/164X |

*Primary Examiner*—D. F. Duggan
*Attorney*—Louis Etlinger

ABSTRACT: A permanent magnetic motor is provided having main and angularly displaced auxiliary windings and means for detecting the direction of rotation of the motor's permanent pole rotor and for producing control signals to cause the motor to rotate in a desired direction. The structure for detecting the rotor rotational direction comprises two separate electrical windings which inductively couple with the magnet pieces of the rotor so that when the rotor rotates, voltages are induced in both of the windings, which voltages are compared to determine whether the rotor is moving in a clockwise or counterclockwise direction of rotation. If the desired direction of rotation is detected, then the input signal applied to the main winding is not altered. If the direction of rotation is opposite to the desired rotation, then a signal of opposite polarity is applied to the main windings. In the event no signal output is detected from the two electrical windings, indicating that the motor did not start, then a pulse of either polarity is applied to the auxiliary winding, such that it initiates rotation, and then direction is sensed and controlled, as above. Thus, the motor may be started and once started may be rotated in a selected direction of rotation.

INVENTOR
JIRAIR A. BABIKYAN

ATTORNEY

INVENTOR
JIRAIR A. BABIKYAN
BY
ATTORNEY

SELF-STARTING SINGLE PHASE MOTOR

BACKGROUND OF THE INVENTION

1. Field of the Invention

This invention relates to a means for starting single-phase permanent magnet motors, and more particularly, a means to start and run the motor in a selected direction.

2. Description of the Prior Art

According to conventional practice, a typical pancake type permanent magnet motor, such as described in U.S. Pat. 3,375,386, of P. Hayner et al. includes a printed circuit stator and a rotating field structure. The latter comprises two groups of circularly disposed permanent magnets, one group on each side of the stator, with alternate opposing poles facing each other. The magnetic flux that is developed is parallel to the motor axis in the air gap between the field structure.

A motor of this type may not start when a signal is impressed on the stator windings depending on the angular position of the stator windings with respect to the magnets on the rotating structure. Therefore, to start the motor in the right direction it is necessary to provide some external mechanical switching arrangements. Thus, the motor becomes manually operated, and there is created problems in packaging design.

Heretofore, other types of single phase permanent magnet motors have been made self-starting by employing an elaborate feedback system to the stator energizing system. The stator energizing system controls the phase and/or frequency of the stator current. A variety of techniques have been employed for deriving the feedback signals. For example, an additional rotor member can be placed on the same shaft with the main rotor. This additional rotor member carries a magnetically permeable member that varies the inductive coupling between windings as it rotates to generate the feedback control signals; or the rotor is provided with a feedback winding.

Unfortunately, the prior art techniques require the incorporation of an additional rotor member. Also, these particular motors start in only one direction. Therefore, these known techniques will not function in this type and size of pancake motor because of a lack of space for additional rotor members. Nor is there space for connecting means available to place feedback windings on this rotor member for it is a rotating permanent magnet structure. In addition, the motor must be able to start in either direction.

SUMMARY OF THE INVENTION

From the foregoing, it will be understood that among the objects of this invention are the following:

To provide a method and means whereby the permanent magnet motor is self-starting and rotates in a preselected direction;

To provide a self-starting permanent magnet motor which does not require additional rotor members to initially start the motor;

To provide the means for detecting the direction of rotation of a permanent magnet type rotor, and for producing an electrical signal representative of the direction of rotation;

To provide the means for changing the direction of rotation of the permanent magnet type motor if the initial direction of rotation is opposite to the preselected direction of rotation;

To provide a permanent magnet self-starting motor that is less expensive to build, and free of external mechanical means to initiate the rotation of the motor.

In accordance with the invention, a motor is provided having permanent magnet rotor structure and a printed circuit stator structure. The stator structure consists of a main winding, an auxiliary winding angularly displaced therefrom, and a pair of rotation direction detecting windings angularly displaced from each other. When the motor is at rest, the angular position of the printed circuit stator assembly is random with respect to the rotating field structures and a particular radial portion of the main winding may be aligned with a south pole, a north pole or may fall between two poles. The result is the motor may rotate in a clockwise direction, a counterclockwise direction or not rotate at all respectively to the above positions. The motor is started by connecting a source of substantially square voltage pulses to the main winding. When the motor starts, a voltage is induced in both direction detecting windings, the relative phase of which is indicative of the direction of rotation. If the direction is the same as the preselected direction, no further control is required. If the direction of rotation is incorrect, a control signal is generated which switches the main winding to a source of opposite polarity pulses to that of the pulses originally applied, thereby reversing direction.

In the event the motor does not start at all, as indicated by the absence of signals on the direction detecting windings, one of the pulse sources is automatically connected temporarily to the auxiliary winding, whereupon the motor starts and its direction of rotation is determined and controlled as above.

The features of novelty which I believe to be characteristic of my invention are set forth with particularity in the appended claims. My invention itself, however, both as to its fundamental principles and to its particular embodiments, will be best understood by reference to the specification and the accompanying drawings, in which:

Figure 3A:
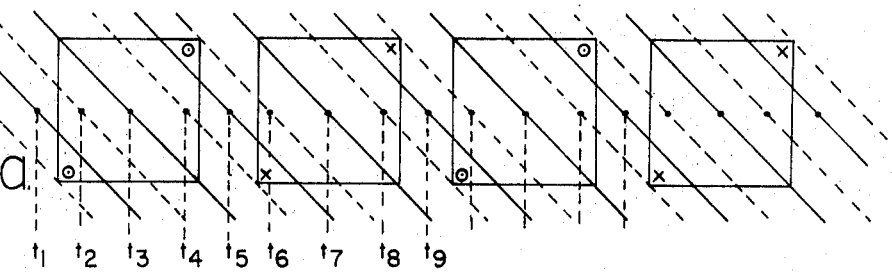
FIG. 3a is a developed view of the magnet pole pieces of one of the motor field units.
Figure 3B:
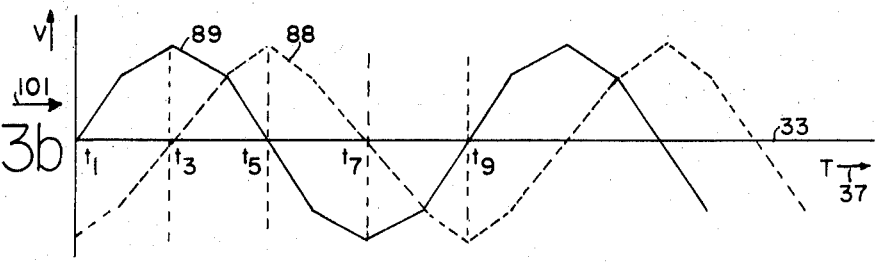
Figure 4:
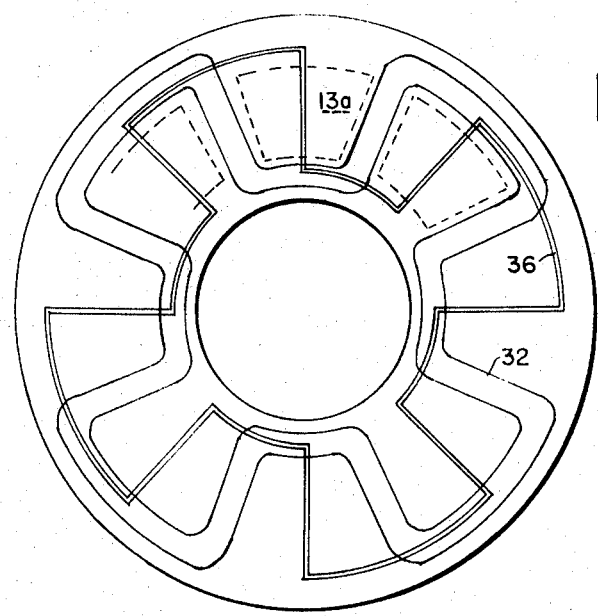
Figure 5:
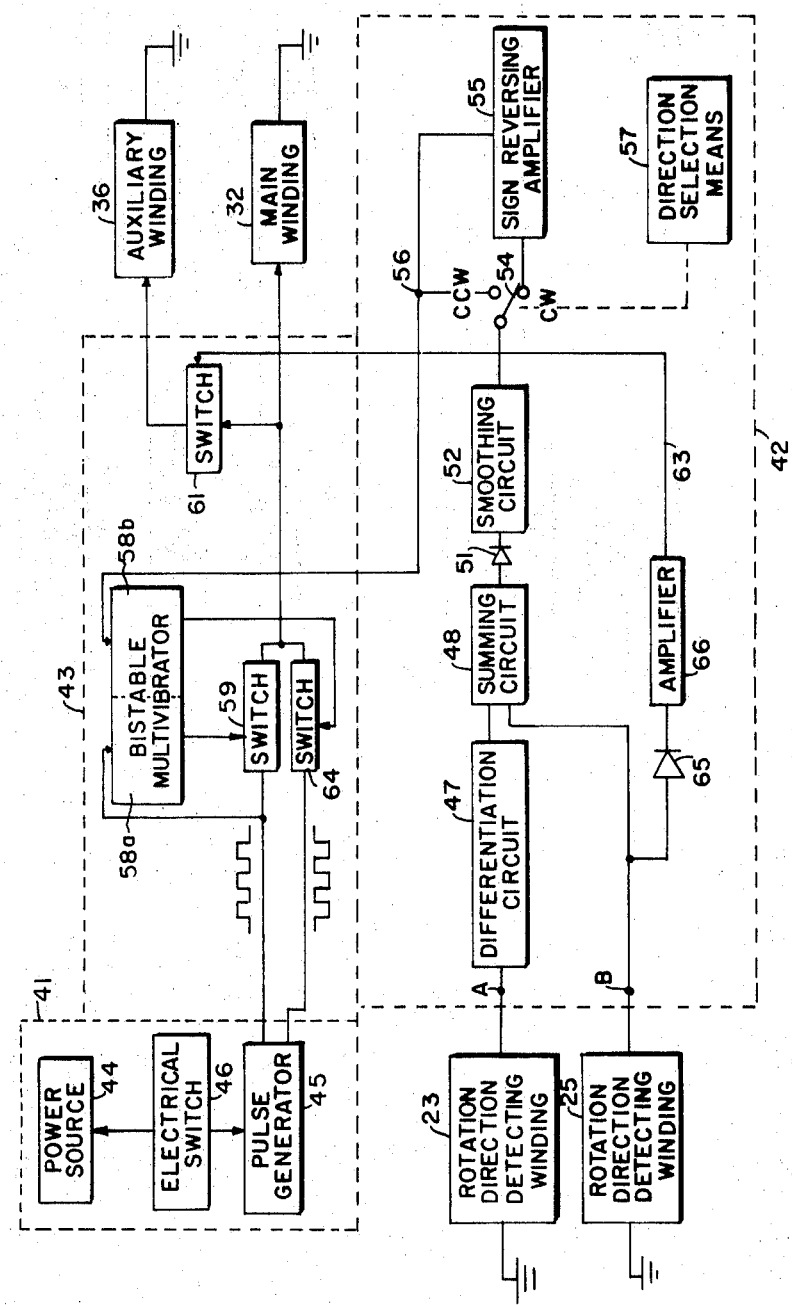

FIG. 3b, c and d are graphs useful in explaining the invention;

FIG. 4 is a schematic diagram illustrating the relative positions of the auxiliary and main windings; and FIG. 5 is a schematic diagram of a typical control circuit which will start the motor and run it in a preselected direction.

DESCRIPTION OF THE PREFERRED EMBODIMENT

Figure 1:
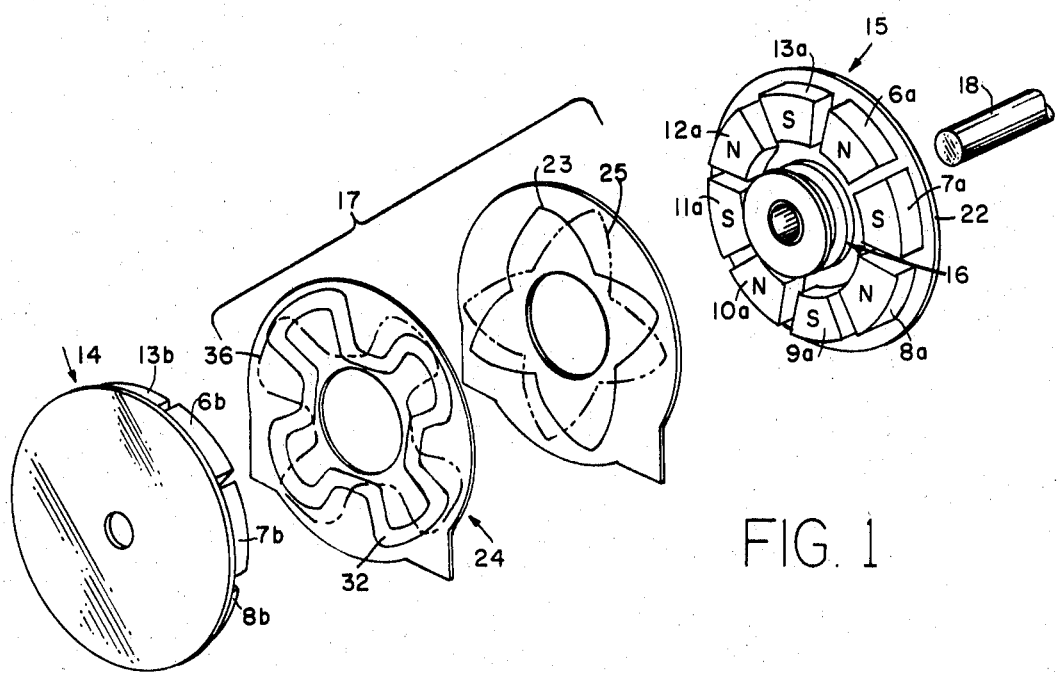
FIG. 1 is an exploded view of the permanent magnet motor with a schematic illustration of the windings.

Referring now more particularly to the motor assembly, illustrated in FIG. 1, a stator assembly 17 is disposed between a pair of rotating field units 14, 15. The field units are secured to a hub assembly 16 which is fastened to a shaft 18 for rotation therewith. The field units comprise a plurality of magnets 6a to 13a and 6b to 13b, respectively projecting from plates 22 of a suitable high permeance ferromagnetic material such as iron. In this embodiment each field unit has four pairs of magnets. The magnets are positioned circularly around and adjacent to the outer edge of plate 22. Each magnet such as 6a is magnetized to the opposite polarity with respect to the adjacent magnets 7a and 13a and to the facing magnet 6b on the other field unit. The magnetic lines of force of each magnet are orientated parallel to the shaft 18, and the resultant field fluxes established by the pair of magnets 6a, 6b—13a, 13b in permanent registration are parallel to the shaft 18 and reside in the air gap. However, since the field units rotate, the pairs of magnets and associated field fluxes also rotate. The separation between the opposing magnets of the field units 14 and 15 as well as the spacing between the stator assembly and the magnets, is made as small as possible by minimizing the thickness of the stator assembly 17 to obtain the greatest possible torque.

The stator assembly 17 comprises a main winding 32, two rotation direction detecting windings 23 and 25 and an auxiliary winding 36 all of which in the preferred embodiment are formed by printed circuit techniques. For clarity of illustration, the main and auxiliary windings 32 and 36 are shown as being formed on a first disc while the two rotation direction detecting windings 23 and 25 are formed on a second disc. While such an arrangement is satisfactory it is preferred that all of the windings be formed in separate layers on a single disc. Such multilayer construction is well known in the art.

Figure 2:
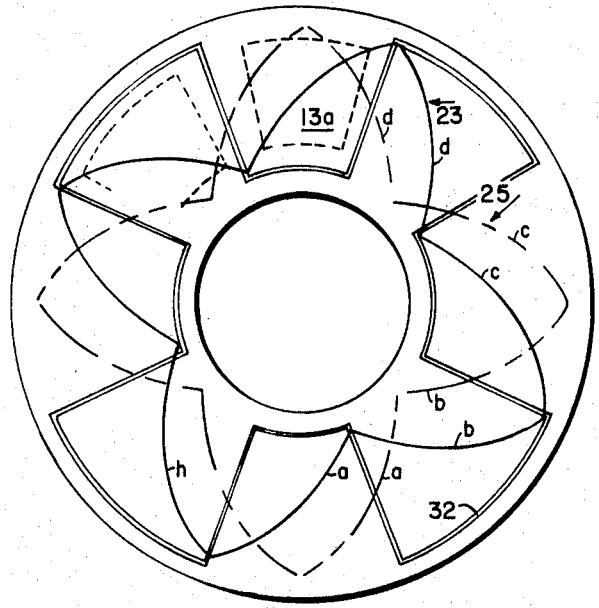
FIG. 2 is a schematic diagram showing the relative position of the rotation direction detecting windings to each other and to the main winding.

Referring now to FIG. 2, there is illustrated the physical configuration of rotation direction detecting windings 23, 25 whose function is to produce a signal which is indicative of the direction of rotation of the rotor. One rotation direction detecting winding is illustrated as a solid conductor 23 (a—h) and the second direction detecting winding is illustrated as the dotted or broken conductor 25 (a—h) for identification purposes only. Also, the illustration in FIG. 2 is for a particular position of the rotor shown by the position of magnets 6a—13a. At this particular time, t, the solid line detecting winding 23 generates its maximum voltage and the dotted line detecting winding 25 generates a zero voltage output. The reason is that at this time a maximum length of each conductive section 23a—23h is cutting the associated flux field generating the maximum induced voltage while the other detecting winding 25 has equal lengths of adjacent conductive sections such as 25d and 25e on the same magnet piece, one conductive section having a positive slope and the other having a negative slope, thus resulting in a zero output.

As illustrated, each of the detecting windings 23, 25 is formed of a plurality of conductive sections, 23a to 23h and 25a to 25h connected in series, that is eight conductive sections or 2 sections for each pair of poles. The position of each conductor section with respect to an adjacent magnet is such that the conductor section crosses from one corner of the magnet, over the geometric center of the magnet and across the opposite corner of the magnet. The reason for this particular shape will be explained subsequently. In addition, adjacent conductive sections are so formed that, at a particular time, t, during rotation, one conductive section 23e crosses from the lower left to the upper right of the adjacent magnet and the adjacent conductive sections 23d and 23f, cross from the upper left to the lower right corner of the adjacent magnets. The reason is that if a wire cuts the flux field of a north pole and a second wire cuts the flux field of an adjacent south pole, the induced voltage in each conductor creates individual currents which flow in the same direction, or are additive. The wires are given positive and negative slopes alternately in order that they may be connected at their converging ends. It will be noted that the eight conductive section, a—h, connected in series define four loops or one loop for each pair of magnet pieces. The four loops define an electrical circuit which matches the configuration of the field units 14, 15 and to produce an output signal.

One direction detecting winding 23 is angularly spaced from the second direction detecting winding 25 by an angle $\alpha$ or $\pi/2$ electrical radians. Because of this angular displacement the induced voltage in one winding leads the voltage induced in the other winding. Whether the voltage in detecting winding 23 is leading or lagging the voltage in detecting winding 25 will depend upon the direction of rotation of the rotor.

FIG. 2 also illustrates the position of the main winding 32 with respect to the two detecting windings 23, 25, and the reason for this relationship will be discussed subsequently.

The reason for the particular shape of the detecting windings 23, 25 is explained in relation to FIG. 3. Referring to FIG. 3a, there is thereby illustrated a developed view of the magnets of one of the field units. In FIG. 3a, the magnets are square in shape and the conducting wires are shown as straight line; the slope of the wire is such that it extends from one corner of the magnet to the diagonally opposite corner of the magnet. Now if the conductive wire is moved through the flux fields associated with the magnet, the voltage induced in the wire will have the wave shape represented in FIGS. 3b, c and d. It is to be noted that this wave form alternates between positive and negative values in a manner similar to a sine wave. It is possible to form the shape of the conductor such that the induced voltage will produce a sine wave or other alternating waveshapes but in the preferred embodiment of this invention the shape of the magnets and the slope of the conductive sections were designed to generate the wave form shown. The reason for this particular shape is that comparison circuits described hereinafter can more readily distinguish between a negative and positive slope when the induced voltage approaches it maximum value whether positive or negative in sign. The relationship between the positive and negative slopes will be explained later with respect to table 1.

Figure 3C:
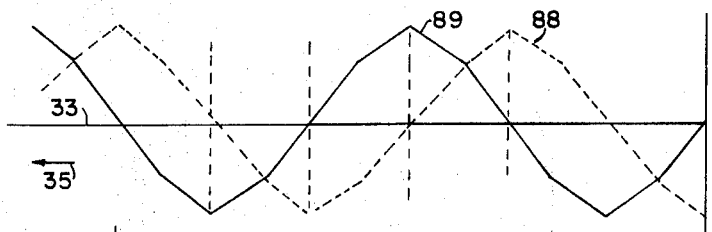
Figure 3D:
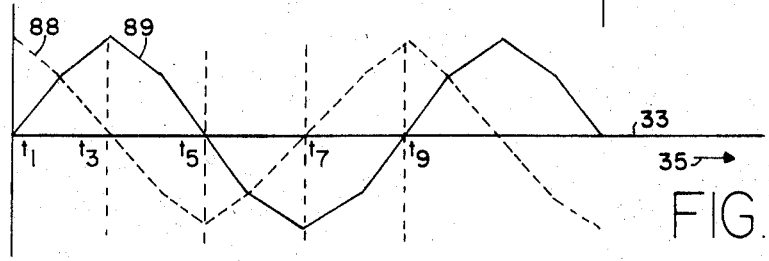

The particular shape of the curve 89 as illustrated in FIG. 3b, is a straight line, positive slope, with a single bend between the time $t_1$ and $t_3$ measured along the abscissa 33 of the graph, and during the period $t_3$ to $t_5$ the same wave form is a straight line having a single band with a negative slope. Thus, it can be seen that at the time $t_3$ a very sharp transition exists between the positive and negative slopes. This sharp transition provides more positive information to the comparison circuits to indicate the direction of rotation. Each set of the detection windings 23 and 25 produces a similar waveform but displaced by 90 electrical degrees, equal to the angular relationship between the direction detection windings 23 and 25. The lead and lag relationship previously discussed is illustrated in FIGS. 3b, c, and d. Referring now to FIG. 3b, signal 89 (solid line), plotted for clockwise rotation of the rotor, is illustrated as leading signal 88 (broken line). FIG. 3c illustrates that phase relationship for counterclockwise rotation of the rotor; time running from right to left and FIG. 3d is a reverse plot of the waveforms of FIG. 3c with time running from left to right for comparison purposes with FIG. 3b.

Thus, the phase lead or lag of one of the signals with respect to the other is indicative of the direction of rotation of the rotor. If these signals are fed to a comparison circuit it will respond to the polarity and slope of the input signals and produce signals representative of the direction of rotation of the rotor. In Table 1, (below) the polarity and slope combinations of signals 88 and 89 are shown for the clockwise and counterclockwise direction of rotor rotation. Using the column entitled "Period" of Table 1 in conjunction with FIGS. 3b and 3d, the lead-lag phase relationship between the signals 88 and 89 is shown in terms of polarity and slope.

TABLE 1.—AMPLITUDE CHARACTERISTIC

|  | Clockwise rotation | | Counterclockwise rotation | | |
| --- | --- | --- | --- | --- | --- |
|  | Polarity | Slope | Polarity | Slope | Period [1] |
| Solid wire | 89+ | + | + | + | $t_1$-$t_3$ |
| Dotted wire | 88− | + | + | − | |
| Solid wire | 89+ | − | + | − | $t_3$-$t_5$ |
| Dotted wire | 88+ | + | − | − | |
| Solid wire | 89− | − | − | − | $t_5$-$t_7$ |
| Dotted wire | 88+ | − | − | + | |
| Solid wire | 89− | + | − | + | $t_7$-$t_9$ |
| Dotted wire | 88− | − | + | + | |

[1] See Figure 3b and 3d for $t_1$ through $t_9$.

Each of these eight combinations is unique to itself. That is, each pair of signals from the detecting windings 23, 25 will be distinct for each portion of the cycle. For example, in the time between $t_1$ and $t_3$ the polarity and slope for wire 89 are both positive while for winding 88 the polarity is minus and the slope is positive. This particular combination does not appear again in any of the seven remaining combinations and, therefore, the comparison circuits will only see one particular combination for each 360 electrical degrees, eliminating any chance of error, signal wise, in detecting the direction of rotation of the rotor.

Previously, with reference to FIG. 2, it was stated that the direction detection windings 23, 25 has had a particular angular relationship with the main winding 32. While this angular relationship may be any angle, the preferred position of the main winding 32 is for the radial sections to lie in the spacing between the magnets 6 to 13, when the detecting windings 23, 25 are producing a maximum and minimum output, respectively, as typically represented at time $t_3$ in FIG. 3b. This becomes important when the motor is at rest and the relationship between the rotor structure and the main windings is as illustrated in FIG. 2, i.e., when the main windings envelope the magnets 6 to 13, since the waveform of the induced voltage in the detecting windings peaks with a sharp slope at its maximum point such that any movement of the rotor will be immediately detected, and the control circuits will respond without delay. Whereas if the induced voltage was represented by a sine wave the rate of change of the slope at the maximum value points is comparatively small and the control circuits would not respond as fast. Thus, for a more efficient system the shape of the waveform is as illustrated in FIGS. 3b, c and d.

The stator structure 17, in addition, includes an auxiliary winding 36, illustrated in FIG. 4. The function of the auxiliary winding 36 is to initiate a rotation of the rotor structure in the event the initial pulse applied to the main winding fails to produce an electromagnetic force to cause a rotation of the rotor. This failure occurs when the motor is at rest and the main winding 32 envelops the outline of the magnets, that is, if the radial portion of main windings 32 falls between two magnets as shown in FIG. 4. In addition, FIG. 4 illustrates the relative position of the auxiliary winding 36 with respect to the main winding 32 (in outline form), with the magnets 6a to 13a superimposed thereon. The auxiliary winding 36 defines the same configurations as the main winding 32; that is, it defines a plurality of reversing loops which are the same shape and size as the main windings 32, but displaced by an angle of $\pi/2$ electrical radians. This is illustrated in FIG. 4 at a particular time, $t$, when the main winding 32 envelops the magnets 6a to 13a, the auxiliary winding 36 is positioned over the center of the magnets 6a to 13a.

Accordingly, if the motor is at rest and the main winding 32 and the magnets 6a to 13a are positioned as illustrated in FIG. 4, current flowing in the main winding created by a unidirectional pulse applied thereto will not interact with the field flux of the magnets 6a to 13a to produce a electromagnetic force to cause the motor to rotate. This is because the main winding is positioned in an area of essentially no magnetic flux. In the above event a unidirectional pulse of any polarity is applied to the auxiliary winding 36 and the current flowing in the auxiliary winding will interact with the field flux associated with the sets of magnets 6 to 13 to produce an electromagnetic torque which causes the rotor structure to rotate in one direction or the other. The direction of rotation, clockwise or counterclockwise, will depend upon whether a positive pulse or a negative pulse is applied to the auxiliary winding and whether a particular radial portion of 36 is on a north pole or south pole. The polarity, however, of the applied pulse is not critical for it will be explained subsequently how the rotor structure may be rotates in any desired direction.

A typical electronic circuit for performing the sequence of steps to start the motor of FIG. 1 is illustrated in block diagram form in FIG. 5.

One of the problems encountered when starting a single phase permanent magnet motor is that when the main winding thereof is energized by a single phase alternating current the polarity of the current changes, and thus, changes the direction of the stator magnetic fields before the rotor moves sufficiently to reach the next pole. This result occurs because the electromagnetic torque produced is insufficient to cause the relatively heavy rotor structure to rotate in any direction sufficiently in the brief interval between positive and negative excursions of the alternating current. In accordance with the present invention, a single pulse of unidirectional current is fed to the stator winding of sufficient duration and magnitude to initiate a rotation of the rotor structure.

The circuits for starting and energizing the motor includes a power section 41, a logic section 42 for comparing signals A and B, from the rotation direction detecting windings, indicating the direction of rotation of the rotor with the selected direction of rotation, and a series of switches 43 which feed pulses of one polarity or another to the main 32 and auxiliary 36 windings.

The power section includes a source of electrical power 44, either AC or DC and a pulse generator 45 for generating positive and negative pulses for energizing the windings of the motor. The pulse generator 45, the power source 44, the switches 43 and the logic section 42 are energized by an electrical switch 46 which may be manually or remotely controlled.

To energize the main winding 32 and start motor, the switch 46 is turned on to connect the power source 44 to the pulse generator 45. A positive pulse from pulse generator 45 is then coupled to the flip side 58a of a bistable multivibrator circuit, and produces an output signal which enables switch 59 to couple positive pulses to the main winding 32. This current pulse in the main winding 32 produces an electrical field which interacts with the flux field associated with the rotor magnets 6 to 13 and thereby creates an electromagnetic electromagnetic torque, causing the rotor structure to rotate, unless the main winding 32 envelops the magnets 6 to 13. Assuming that the rotor rotates then a signal will be induced in the direction detecting windings 23, 25 (signals A and B). Signals A and B, are then coupled to logic section 42.

The signals A and B, though not sinusoidal in the preferred embodiment, will be considered sine waves for the purpose of simplifying this discussion in illustrating the operation of the comparison circuits.

In the logic section 42, the signal A from winding 23 is differentiated by circuit 47 and fed simultaneously with signal B to summing circuit 48. The output of the summing circuit 48 is rectified by diode 51 and then integrated by smoothing circuit 52. Thus, any signal level out of circuit 52 will be positive in value. When the output of smoothing circuit 52 is zero, ccw rotation is indicated and when the output is a positive value, cw rotation is indicated. Table 2 demonstrates that this is the case.

TABLE 2

|  | Counterclockwise (A leads B by $\pi/2$) | Clockwise (B leads A by $\pi/2$) |
|---|---|---|
| A | Sin wt. | Sin wt. |
| B | Sin (wt. $-\pi/2$) | Sin (wt. $+\pi/2$). |
| $\frac{dA}{dt}+B$ | Cos wt. $-$ cos wt. $=0$ | Cos wt. $+$cos wt.$=2$ cos wt. |

It is seen in Table 2 that for clockwise rotation, signal A is Sin $wt$ and signal B is Sin $(wt+\pi/2)$, and for counterclockwise rotation, Signal A is Sin $wt$ and Signal B is Sin $(wt-\pi/2)$. Accordingly, the differential of A with respect to time plus B is zero when rotation is counterclockwise and is equal to 2 Cos $wt$ when rotation is clockwise.

The zero or positive signal lever representing the direction of rotation is employed in conjunction with a single pole double throw switch 54, (controlled by direction selector 57) and polarity reversing amplifier 55. Their function is to produce a signal level on line 56 which is zero or negative when the direction of rotation of the rotor is in agreement with the preselected direction, represented by the position of the switch 54, and which is positive in value when the direction of rotor rotation is not in agreement with the selected direction of rotation. The direction selection means 57 may be a mechanical arrangement, an electrical switch unit or other known methods. Also the selection means 57 may be remotely located from the motor system.

When the signal level on line 56 is zero or negative, the indication is that the pulse initially applied to the main winding 32 was of the proper polarity to produce a rotation in the desired direction and no change in the polarity of subsequent pulses applied to the main windings 32 is necessary. In the alternative when a positive signal level appears on line 56, the indication is that the motor has rotated, but in the wrong direction, and that corrective action is to be taken to produce a rotation in the desired direction.

When the signal level on line 56 is positive, indicating rotation in the wrong direction, the signal will cause bistable multivibrator 58 to now produce a signal out of 58b which enables switch 64 to couple a series of negative pulses from the pulse generator 45 to the main winding 32. This will produce an electromagnetic force which will reverse the direction of rotation, and then no change in the polarity of subsequent pulses applied to the main winding 32 is necessary. The above sequence of steps is performed in a much shorter period of time then it takes for the magnets 6 to 13 (rotor structure) to move through an angle of 180 electrical degrees. Conversely, if the windings were to rotate and the magnets to be stationary then the tie time period would be less than the time it would take for a winding to move from one magnet to the adjacent magnet of the opposite polarity.

Assuming the motor rotates, then signal B will be present, and signal B will be detected by diode 64 and amplified by amplifier 66 and there will be a signal on line 63. The signal on line 63 is an inhibiting signal which prevents switch 61 from passing any of the pulses from switches 59 and 64 to the auxiliary winding 36. Now if the motor is stopped in such a position that when a signal is applied to the main winding 32 the motor will not rotate, signal B will be absent and there will not be an inhibiting signal on line 63 and switch 61 will couple any pulse in line 62 to auxiliary winding 36. This pulse in the auxiliary winding 36 will produce an electromagnetic force which will cause the motor to rotate.

Once the motor rotates in either direction due to energization of auxiliary winding 36, the sequence of steps as previously set forth are followed until the motor turns in the selected direction.

While the above description relates to specific principles of this invention, it is to be understood that this description is made only by way of example and not as a limitation thereon, for one skilled in the art may make modifications thereto but still be within the true spirit and scope of this invention as set forth in the appended claims.

I claim:

1. A self-starting single phase synchronous motor, comprising:
   a rotor assembly, said rotor assembly being mounted for rotation and having a plurality of field magnetic pieces;
   a stator assembly, said stator assembly having a main winding and a first and second rotation direction detecting windings, said rotation direction detecting windings being angularly displaced from each other; and
   said rotor assembly being arranged to project a magnetic field through said stator assembly so as to inductively couple a signal into each of said rotation direction detection windings upon rotation of said rotor assembly.

2. A self-starting single phase synchronous motor in accordance with claim 1, in which said stator assembly further includes an auxiliary winding angularly displaced from said main winding.

3. A self-starting single phase synchronous motor in accordance with claim 2, in which said rotor assembly comprises first and second field units, said first and second field units mounted for rotation together on an axis, said first and second field units being spaced apart in the direction of said axis to provide a gap, said magnetic pieces arranged to direct a magnetic field of uniform intensity across said gap, said stator assembly being disposed in said gap and secured against rotation with said field units.

4. A self-starting single phase synchronous motor in accordance with claim 3, in which said main winding, said auxiliary winding and said first and second rotation direction detecting windings are disposed in planes parallel to and electrically insulated from each other, said planes being perpendicular to said axis.

5. A self-starting single phase synchronous motor in accordance with claim 3, in which each of said field units comprise a plurality of equally spaced magnetic pieces located in a circular fashion around said axis.

6. A self-starting single phase synchronous motor in accordance with claim 5, in which said main winding and said auxiliary winding each comprise a metallic type winding bonded to a substrate and each defining a tortuous path corresponding to spaces around and between said magnet pieces of said field units.

7. A self-starting single phase synchronous motor in accordance with claim 6, in which the angular displacement between said main winding and said auxiliary winding is such that at one position of said rotor's rotation cycle the radial portions of said main winding are in registration with the spaces between said magnetic pieces and the radial portions of said auxiliary winding are substantially in registration with the center of said magnetic pieces.

8. A self-starting single phase synchronous motor in accordance with claim 6, in which the angular displacement between said main winding and said auxiliary winding is $\pi/2$ radians.

9. A self-starting single phase synchronous motor as defined in claim 6 in which said first and second rotor direction detecting winding each comprise a metallic type winding bonded to a substrate substantially perpendicular to said axis, each having a generally spiral configuration and defining a series of alternately positive and negative slope winding sections joined at their adjacent ends, said sections defining a path such that at one position of said motor's rotation cycle each of said winding sections of one of said detecting windings cross one corner of said adjacent magnetic piece on said field unit, passes over the geometric center of said magnetic piece and across the opposite corner thereof.

10. A self-starting single phase synchronous motor in accordance with claim 9 in which each of said first and said second rotation direction detecting windings is comprised of N winding sections, where N is equal to the number of said magnetic pieces on one of said field units.

11. A self-starting single phase synchronous motor in accordance with claim 9 in which the angular displacement between said first and second rotation direction detecting windings is one-half of the mechanical angle which lies between a centerline which passes through one of said magnetic pieces and a centerline which passes through an adjacent magnetic piece lying in the same plane.

12. A self-starting single phase synchronous motor in accordance with claim 9 in which the electrical angle between said first and second rotation direction detecting windings is $\pi/2$ radians.

13. A self-starting single phase synchronous motor in accordance with claim 9 in which said winding sections of said one of said direction detecting windings crosses one corner of said adjacent magnetic pieces on said field units, passes over the geometric center of said magnetic piece and across the opposite corner thereof when the radial portions of said main winding are substantially in registration with the spaces between said magnetic pieces on said field units.